US012263802B2

United States Patent
Weimer et al.

(10) Patent No.: US 12,263,802 B2
(45) Date of Patent: Apr. 1, 2025

(54) VEHICLE PASSENGER RESTRAINT SYSTEM

(71) Applicant: ZF AUTOMOTIVE GERMANY GMBH, Alfdorf (DE)

(72) Inventors: Benjamin Weimer, Spraitbach (DE); Marc Elstner, Mutlangen (DE); Werner Freisler, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/015,151

(22) PCT Filed: Jul. 5, 2021

(86) PCT No.: PCT/EP2021/068448
§ 371 (c)(1),
(2) Date: Jan. 9, 2023

(87) PCT Pub. No.: WO2022/008406
PCT Pub. Date: Jan. 13, 2022

(65) Prior Publication Data
US 2023/0249641 A1 Aug. 10, 2023

(30) Foreign Application Priority Data
Jul. 10, 2020 (DE) .................... 10 2020 118 339.0

(51) Int. Cl.
*B60R 21/231* (2011.01)
*B60R 21/233* (2006.01)
*B60R 21/2338* (2011.01)

(52) U.S. Cl.
CPC ...... *B60R 21/23138* (2013.01); *B60R 21/233* (2013.01); *B60R 21/2338* (2013.01);
(Continued)

(58) Field of Classification Search
CPC ............ B60R 21/231; B60R 21/23138; B60R 2021/23146; B60R 21/233;
(Continued)

(56) References Cited

U.S. PATENT DOCUMENTS

2012/0139211 A1* 6/2012 Loibl .................... B60R 21/207
280/728.2
2018/0326938 A1* 11/2018 Rickenbach ........ B60R 21/2338
(Continued)

FOREIGN PATENT DOCUMENTS

CN 110395213 A 11/2019
DE 102017008166 A1 4/2018
(Continued)

OTHER PUBLICATIONS

Description Translation for DE 102018104392 from Espacenet (Year: 2018).*
(Continued)

*Primary Examiner* — Jason D Shanske
*Assistant Examiner* — Daniel M. Keck
(74) *Attorney, Agent, or Firm* — Tarolli, Sundheim, Covell & Tummino LLP (57) ABSTRACT

A vehicle occupant restraint system comprises a vehicle seat (12) which includes a backrest (15) with a seat back surface (24), the seat back surface (24) being provided for a vehicle occupant (26) seated in the vehicle seat (12) to lean against the same, and comprising an airbag module (16) integrated in the vehicle seat (12) which includes an airbag (18) being U-shaped in a horizontal section plane, wherein the airbag (18) includes an L-shaped restraining portion (20) and an L-shaped supporting portion (22), wherein the L-shaped restraining portion (20) has a fillable cushioning portion (30) forming a first leg of the L which is positioned along a seat longitudinal direction (L) spaced apart from the seat back surface (24) and which includes a baffle (42) being directed toward the seat back surface (24) and being provided to cushion the vehicle occupant (26), if he/she is displaced forward along the seat longitudinal direction (L), and includes a fillable connecting portion (32) forming a second leg of the L which connects the cushioning portion (30) to the vehicle seat (12), wherein the L-shaped supporting portion (22) includes a fillable first bearing portion (34) forming a first leg of the L and being positioned along a seat longitudinal direction (L) behind the backrest (14) and a second bearing portion (36) forming a second leg of the L which connects the first bearing portion (34) to the vehicle seat (12), wherein the connecting portion (32) of the
(Continued)

restraining portion (20) and the second bearing portion (36) of the supporting portion (22) form a transverse leg (40) of the U, wherein the supporting portion (22) includes a bearing surface (44) directed toward the backrest (14) and counteracts a load (F) being directed away from the seat back surface (24) and acting on the restraining portion (20), if the vehicle occupant (26) impacts the baffle (42), so as to stabilize the restraining portion (20) relative to the vehicle seat (12).

20 Claims, 5 Drawing Sheets

(52) U.S. Cl.
CPC ............... *B60R 2021/23146* (2013.01); *B60R 2021/23308* (2013.01); *B60R 2021/23384* (2013.01)

(58) Field of Classification Search
CPC ........... B60R 2021/23308; B60R 2021/23316; B60R 2021/23324; B60R 2021/23332; B60R 21/2338; B60R 2021/23384; B60R 2021/23386

See application file for complete search history.

(56) References Cited

U.S. PATENT DOCUMENTS

| | | | |
|---|---|---|---|
| 2019/0299903 A1 | 10/2019 | Nagasawa | |
| 2020/0189513 A1* | 6/2020 | Volkmann | B60R 21/207 |

FOREIGN PATENT DOCUMENTS

| | | |
|---|---|---|
| DE | 102017131140 A1 | 6/2019 |
| DE | 102018104392 A1 | 8/2019 |
| WO | 2007/65650 A2 | 6/2007 |
| WO | 2015/145285 A1 | 10/2015 |
| WO | 2019/197164 A1 | 10/2019 |

OTHER PUBLICATIONS

PCT International Search Report for corresponding International Application Serial No. PCT/EP2021/068448, mailed Sep. 10, 2021, pp. 1-5.

\* cited by examiner

VEHICLE PASSENGER RESTRAINT SYSTEM

RELATED APPLICATIONS

This application is a U.S. National Stage Application filed under 35 USC 371 claiming priority to Serial No. PCT/EP2021/068448, filed on 5 Jul. 2021; which claims priority from German Patent Application DE 10 2020 118 339.0, filed 10 Jul. 2020, the entireties of which are hereby incorporated herein by reference.

TECHNICAL FIELD

The invention relates to a vehicle occupant restraint system.

BACKGROUND

Among other things, regarding the topic of autonomous driving, considerations are made to offer the vehicle occupants greater freedom in terms of their seating position. This entails that the position of the vehicle seats relative to other vehicle components becomes more indefinite. Consequently, there will be the necessity to equip the vehicle seats with airbags that have sufficient inherent rigidity to safely cushion the occupant seated in the associated seat even without any possibility of supporting the airbags on other vehicle components.

SUMMARY

It is therefore the object of the invention to improve the stability and/or inherent rigidity of an airbag in a vehicle occupant restraint system.

This object is achieved by a vehicle occupant restraint system which comprises a vehicle seat having a backrest including a seat back surface, wherein the seat back surface is provided for a vehicle occupant seated in the vehicle seat to lean against the same. Moreover, an airbag module integrated in the vehicle seat is provided which comprises an airbag that is U-shaped in a horizontal section plane and comprises an L-shaped restraining portion and an L-shaped supporting portion. The L-shaped restraining portion includes a fillable cushioning portion forming a first leg of the L and being positioned along a seat longitudinal direction spaced apart from the seat back surface, wherein the cushioning portion includes a baffle directed toward the seat back surface which is provided to cushion the occupant, when he/she is displaced forward along the seat longitudinal direction. In addition, the L-shaped restraining portion comprises a fillable connecting portion forming a second leg of the L and connecting the cushioning portion to the vehicle seat. Further, the L-shaped supporting portion includes a fillable first bearing portion forming a first leg of the L which is positioned along a seat longitudinal direction behind the backrest, and a second bearing portion forming a second leg of the L and connecting the first bearing portion to the vehicle seat. The connecting portion of the restraining portion and the second bearing portion of the supporting portion form a transverse leg of the U of the U-shaped airbag. Moreover, the supporting portion has a bearing surface directed toward the seat back and, in the filled state of the airbag, counteracts a load directed away from the seat back surface which acts upon the restraining portion, if the vehicle occupant impacts the baffle, so as to stabilize the restraining portion relative to the vehicle seat.

In the deployed state of the airbag, the L-shaped supporting portion is shaped such that the bearing surface is adjacent to the backrest substantially form-fittingly on the side and at the rear so that the airbag can bear against the backrest and thus is stabilized. Specifically, by an airbag designed in this way the load introduced into the airbag by the vehicle occupant can be deflected via the supporting portion into the backrest and, thus, the vehicle seat. Consequently, by said stabilization and support caused by the supporting portion via the airbag geometry, the inherent rigidity of the airbag, specifically of the restraining portion, can be increased and the restraining portion can be better held in position.

The restraining portion, specifically the cushioning portion, should preferably maintain as far as possible, even while cushioning the vehicle occupant, the position it holds in the unloaded state. In particular, the tendency of the restraining portion to laterally bend away can thus be prevented or at least can be limited to a minimum harmless to vehicle occupant restraint. Vehicle-side bearing surfaces for the restraining portion of the airbag can be dispensed with.

Since the whole airbag is integrated in the vehicle seat, the airbag is always in the correct position to cushion the vehicle occupant in a situation of restraint, even if the vehicle seat is rotated relative to the vehicle longitudinal direction or, for example, the backrest is reclined into a comfort position.

The seat longitudinal direction is defined in this case by the direction of arrangement of the seat back surface of the backrest and of a seat portion on which the vehicle occupant sits, and corresponds to the direction in which the vehicle occupant seated in the seat looks. In a conventional seat orientation, the seat longitudinal direction coincides with a vehicle longitudinal direction. A seat vertical direction corresponds to the vertical in this case.

In a first embodiment, the supporting portion and the restraining portion can be formed by one or more superimposed U-shaped chambers.

In a preferred embodiment, the restraining portion and the supporting portion are formed by two separate main chambers of the airbag. The main chamber forming the supporting portion and/or the main chamber forming the restraining portion may have plural chambers, as a matter of course, which are disposed specifically superimposed in the respective main chamber.

In one embodiment, the main chamber forming the supporting portion can be configured by an auxiliary airbag. The auxiliary airbag is preferably disposed in the interior of the airbag, specifically at least in the area of the L-shaped supporting portion. In further embodiments, the auxiliary airbag disposed in the interior of the airbag can be disposed at least partially in the connecting portion of the restraining portion.

In a typical embodiment, the main chamber forming the supporting portion or the auxiliary airbag in a filled state has a higher internal pressure than the main chamber forming the restraining portion. The higher internal pressure of the airbag in the area of the supporting portion further helps improve the support of the airbag on the vehicle seat and, thus, again increase specifically the stability and inherent rigidity of the airbag.

In a typical embodiment, the airbag module includes a gas source, specifically an inflator, for filling the airbag. The inflator fills, after being activated, at first the auxiliary airbag or the main chamber forming the supporting portion, before the gas overflows into the main chamber forming the restraining portion. Preferably, the airbag includes overflow openings and/or overflow valves for this purpose which are disposed in the jacket area of the auxiliary airbag or a main chamber partition. Alternatively, also separate inflators can be associated with the auxiliary airbag and the main chamber forming the restraining portion or, respectively, with the main chamber forming the supporting portion and the main chamber forming the restraining portion, or, resp., the gas can be distributed by a suitable gas diffusor.

Furthermore, the airbag, specifically the restraining portion and/or the supporting portion, can additionally comprise a stabilizing element.

A stabilizing element disposed on the restraining portion is designed in particular so that it counteracts a load directed away from the seat back surface and acting on the cushioning portion, if the vehicle occupant impacts the baffle, so as to stabilize the cushioning portion relative to the connecting portion. Such stabilizing element reduces a movement of the cushioning portion in the seat longitudinal direction and, thus, relative to the connecting portion, and helps increase the dimensional stability of the airbag and can stabilize specifically the position of the cushioning portion relative to the connecting portion. The stabilizing element helps further increase the inherent rigidity of the airbag.

It is basically possible to dispose the stabilizing element in an interior of the fillable area of the supporting portion and/or of the restraining portion of the airbag or on the outside of the fillable area.

In one embodiment, the stabilizing element is formed by one or more tethers extending in an interior of the fillable area of the restraining portion and/or of the supporting portion.

In preferred variants, at least one tether is provided in the fillable area of the airbag, specifically in the fillable area of the restraining portion and/or of the supporting portion, the tether being L-shaped when flatly spread, corresponding to the L-shaped cross-section of the restraining portion and/or the supporting portion. In addition, also at least one tether may be provided which, when flatly spread, is U-shaped corresponding to the U-shaped cross-section of the airbag. In those cases, the at least one tether has a flat design and by its shape follows the outer contour of the airbag or the outer contour of the restraining portion and/or the supporting portion. In a substantially upright position of the backrest, the at least one tether is oriented substantially horizontally in the deployed and filled airbag.

Preferably, at several points the at least one tether is connected to the jacket of the airbag and/or the jacket of the auxiliary airbag, in particular at least at the inner and outer surface parts.

Moreover, there can be provided even plural, such as two, tethers which are superimposed perpendicularly to the seat longitudinal direction and which divide the restraining portion and/or the supporting portion into plural superimposed fillable chambers.

In another variant, the stabilizing element is formed by at least one tether that is coupled on the seat side to a retraction mechanism which shortens the length of the tether in the fillable area of the restraining portion during the situation of restraint. It is possible, for example, to fabricate the tether of a webbing material or any other suitable material and to provide a belt retractor or a belt tensioner at the vehicle seat as retraction mechanism to which the tether is connected. Preferably, on the airbag side the tether is fastened to the outer wall of the cushioning portion facing the baffle, specifically on the outer surface part. If the situation of restraint occurs, the retraction mechanism is activated and attracts the tether so that the effective length of the tether between the retraction mechanism and a fastening point of the tether in the cushioning portion is reduced. In this way, the cushioning portion can be pulled more closely to the seat back surface. This can ensure the cushioning portion to be stabilized in its position when the vehicle occupant immerses. Moreover, the load applied to the cushioning portion by the occupant can be additionally absorbed by the tether and can be introduced into the vehicle seat. The retraction mechanism is activated, for example, just before or only when the occupant immerses into the airbag.

In another possible variant, the stabilizing element is disposed on the outside of the airbag and comprises at least one fabric sail. The fabric sail in such variant is fixed specifically on the outside of the jacket, on the cushioning portion and the connecting portion, at the transition formed by the cushioning portion and the connecting portion. This measure helps connect the cushioning portion additionally to the connecting portion, and loads acting on the cushioning portion when the occupant immerses can be absorbed by the connecting portion and transmitted to the vehicle seat so that the position of the cushioning portion and the L-shape of the restraining portion are additionally stabilized. The fabric sail is preferably designed as a right-angled triangle and is fixed by its two legs on the outside of the connecting portion and the outside of the cushioning portion, viz., e.g., at the respective transition of a lateral part to the outer surface part of the airbag jacket to achieve proper load transfer.

As a matter of course, plural, even different additional stabilizing elements may be provided on the airbag. All described stabilizing elements can complement one another mutually and can additionally increase the dimensional stability and inherent rigidity of the airbag each per se or in combination.

Further, at a free end of the cushioning portion of the airbag, a fillable projection can be provided which, in the completely filled state of the airbag, extends toward the seat back surface and delimits specifically the baffle at the free end of the cushioning portion. Said fillable projection improves the protection in the case of oblique crash, for example, in which the occupant does not immerse into the baffle perpendicularly to the latter, but is rather oriented toward the free end of the cushioning portion. For stabilizing said fillable projection, particularly at least one of the above-described flat tethers can extend even into the fillable projection and there can be connected to the jacket of the airbag.

In general, a jacket of the airbag forming an outer wall of the airbag can be composed of plural cut parts. The cut parts preferably comprise at least two U-shaped lateral parts as well as an inner and outer surface area part each of which is connected at its peripheral edges to the lateral parts. Moreover, a front and/or rear edge part may be provided which is connected to the two surface parts at a free end of the cushioning portion or the first bearing portion. The baffle of the cushioning portion can be part of the inner surface part. The front and/or rear edge part moreover can be formed integrally with the U-shaped lateral parts.

The jacket of the auxiliary airbag which encloses an area of the auxiliary airbag fillable with filling gas is composed of two L-shaped lateral parts as well as inner and outer surface parts, for example, each of the inner and outer surface parts being connected to the lateral parts at their peripheral edges.

In this way, all cut parts can be designed so that they can be flatly spread each per se and thus can be simply cut out of a fabric panel, whereas the completed airbag has a complex three-dimensional shape.

As a matter of course, the shape of the individual cut parts can be freely chosen at the skilled person's discretion, wherein, e.g., portions of the above-mentioned cut parts also may integrally merge into each other or may be realized at a different cut part.

In one embodiment, the airbag has a substantially constant expansion along the seat vertical direction, viz. a substantially constant height, over the entire length of the U-shape. The cushioning portion, the connecting portion as well as the first and second supporting portions thus have a constant height. The baffle of the cushioning portion therefore is approximately rectangular and is preferably oriented approximately perpendicularly to the seat longitudinal direction and/or substantially in parallel to the seat back surface.

In an alternative embodiment, the supporting portion has a constant height, but the expansion of the connecting portion of the restraining portion is increased along the seat vertical direction, that is, the height of the connecting portion starting from the backrest to the transition to the cushioning portion (this point forms a corner where the transverse leg and the longitudinal leg of the L of the restraining portion are adjacent). Even in this embodiment, the cushioning portion preferably has a constant height and is specifically plate-shaped so that the baffle formed at the cushioning portion has the same height along a seat transverse direction at each position.

Another alternative embodiment can provide that additionally or only the expansion and, thus, the height of the second bearing portion of the supporting portion is increased starting from the fastening on the vehicle seat toward the first bearing portion.

BRIEF DESCRIPTION OF THE DRAWINGS

In the following, the invention shall be illustrated in detail by means of plural embodiments with reference to the attached Figures, wherein the drawings show in.

DESCRIPTION

The Figures illustrate a vehicle occupant restraint system 10 comprising a vehicle seat 12 which includes an airbag module 16 integrated in a backrest 14.

Apart from the backrest 14, the vehicle seat 12 also includes a conventionally known seat portion 15, the backrest 14 and the seat portion 15 being arranged one behind the other in a seat longitudinal direction L. In a conventional vehicle in a normal driving situation, the seat longitudinal direction L coincides with a vehicle longitudinal direction. However, it is also conceivable to provide driving situations in which the vehicle seat 12 is disposed in a deviating position so that the seat longitudinal direction L deviates from the vehicle longitudinal direction or is even oriented against the latter.

Figure 1:
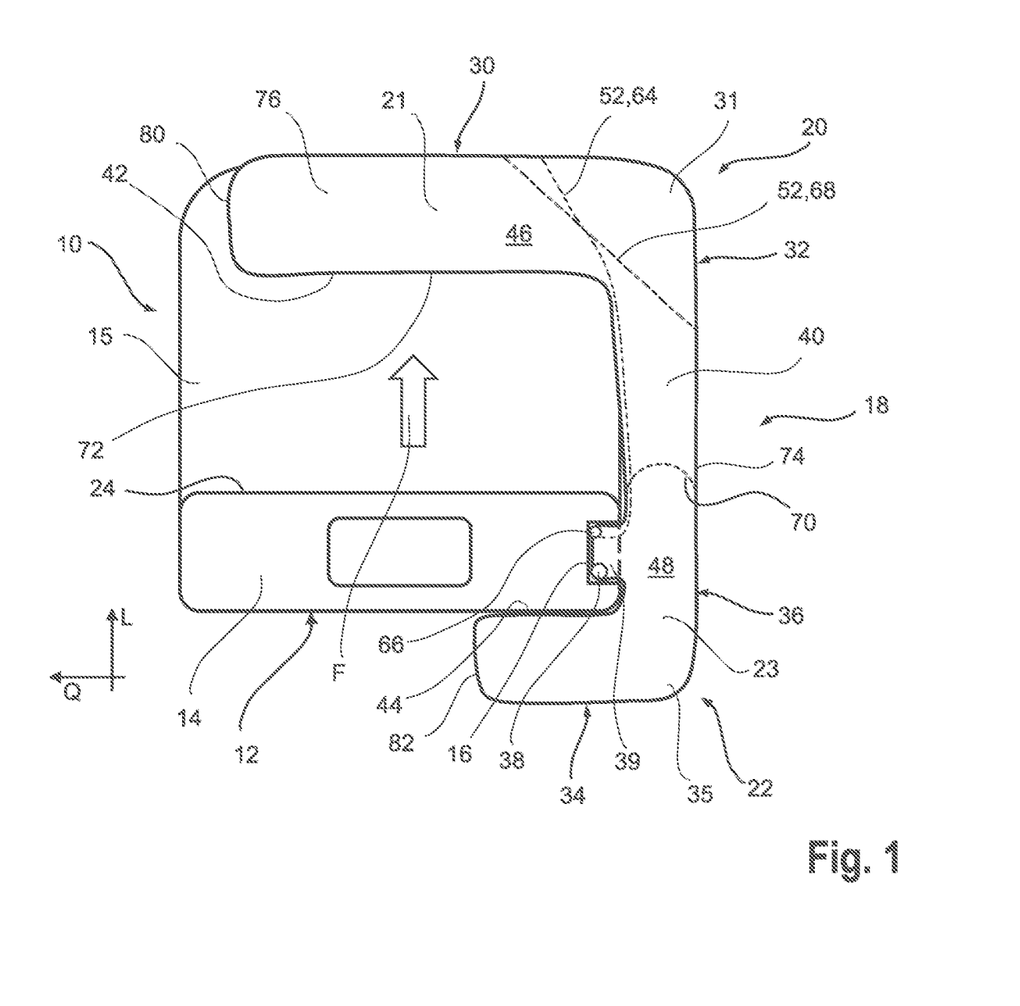
FIG. 1 a schematic top view onto a vehicle occupant restraint system according to the invention comprising a vehicle seat and an airbag in the completely filled state.

FIG. 1 shows the vehicle occupant protection system 10 in general, while the further Figures illustrate details of preferred embodiments.

Figure 6:
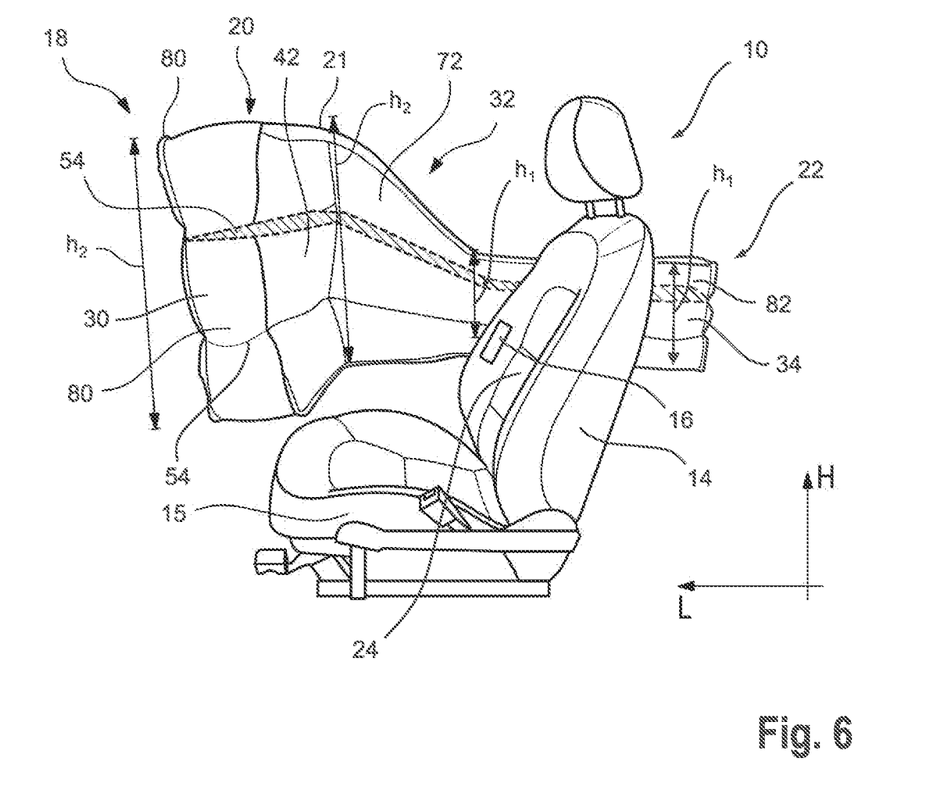
FIG. 6 the vehicle occupant restraint system according to the invention as set forth in a third embodiment in a schematic perspective view.

Before a situation of restraint occurs, an airbag 18 is accommodated in the airbag module 16 in a folded state. If a situation of restraint occurs, the airbag 18 is filled with filling gas via an inflator 38 and deploys out of the backrest 14 into the three-dimensional U-shaped form as shown in FIGS. 1 and 6, for example. Specifically, a section across the airbag 18 along a horizontal section plane is U-shaped.

The airbag 18 is composed of a fillable L-shaped restraining portion 20 and an L-shaped supporting portion which, in typical embodiments, are in fluid communication with each other.

The restraining portion 20 is composed of a cushioning portion 30 and a connected fillable connecting portion 32, the cushioning portion 30 being in fluid communication with the connecting portion 32. The cushioning portion 30 and the connecting portion 32 are aligned approximately at right angles with each other, as can be seen from FIGS. 1, 4 and 5, for example, so that the cushioning portion 30 forms a first leg and the connecting portion 32 forms a second leg of the L. The restraining portion 20 extends from the inflation mouth 39 and the fastening of the airbag 18 on the vehicle seat 12 to the free end 80.

The supporting portion 22 is composed of a first bearing portion 34 and a connected second bearing portion 36, the first bearing portion 34 being in fluid communication with the second bearing portion 36. As is evident from FIG. 1, for example, in the deployed and filled state the first bearing portion 34 and the second bearing portion 36 are aligned approximately at right angles with each other and with a bearing surface 44 are adjacent substantially form-fittingly to a side and rear portion of the backrest 14 so that the first bearing portion 34 forms a first leg and the second bearing portion 36 forms a second leg of the L, the L being arranged to be mirrored with respect to the L of the restraining portion 20. The supporting portion 22 extends from the inflation mouth 39 and the fastening of the airbag 18 on the vehicle seat 12 to the free end 82.

Figure 4:
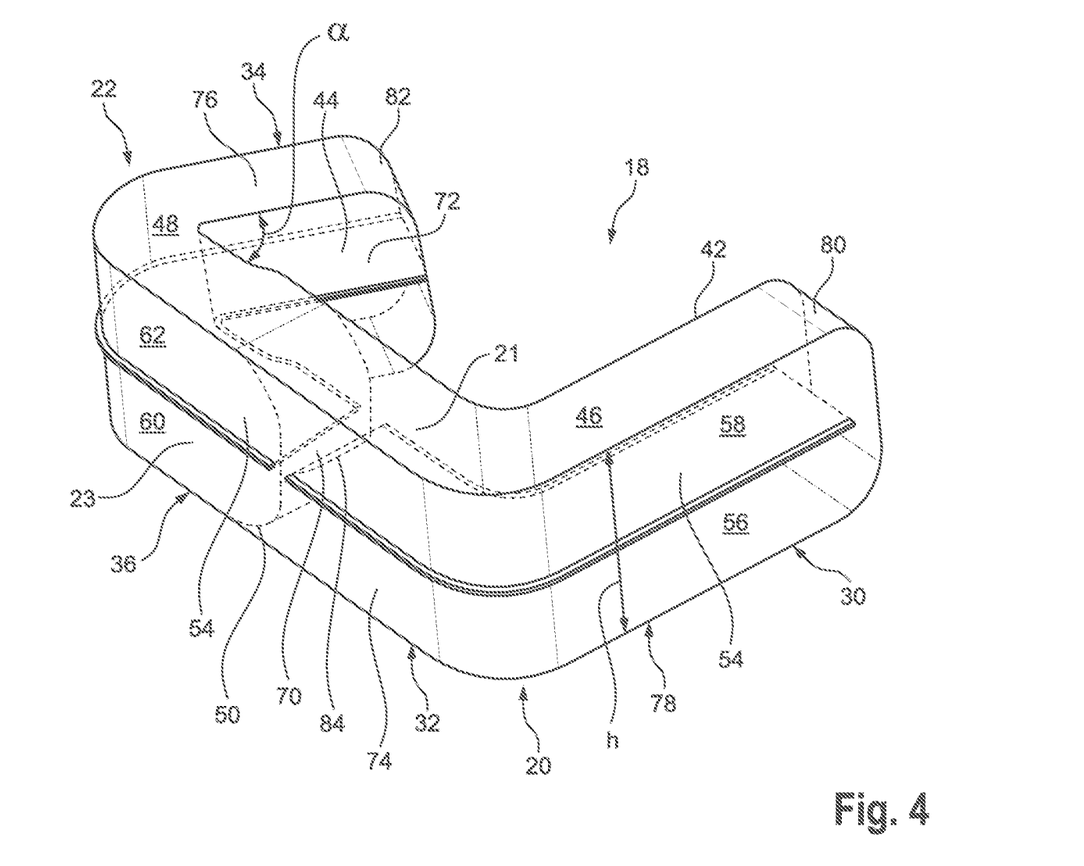
FIG. 4 the airbag of the vehicle occupant restraint system according to the invention of FIGS. 2 and 3 in a schematic perspective view.
Figure 5:
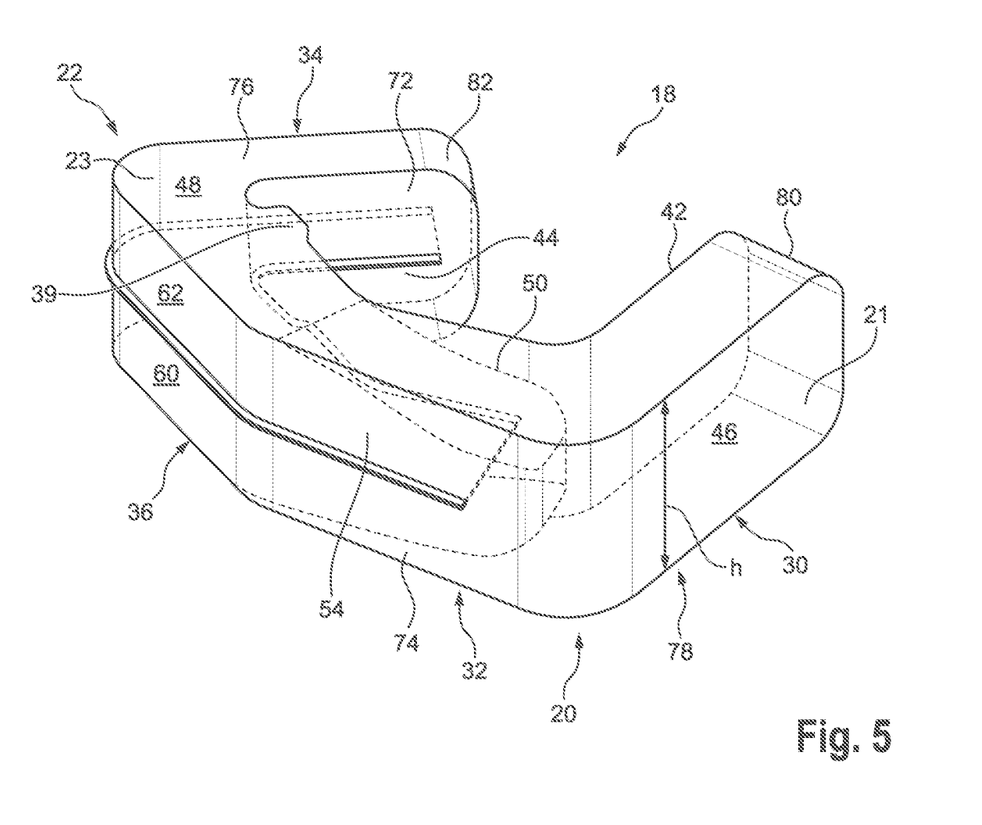
FIG. 5 the airbag of the vehicle occupant restraint system according to the invention as set forth in a second embodiment in a schematic perspective view.

As is evident from FIGS. 4 and 5, for example, the first bearing portion 34 and the second bearing portion 36 can be configured so that, in a filled state not mounted on the vehicle seat 12, they are aligned with each other at an angle of $\alpha \leq 90°$, specifically at an angle in the range of $60° \leq \alpha \leq 90°$. Such alignment of the first bearing portion 34 with the second bearing portion 36 at an angle of $\alpha \leq 90°$ helps additionally increase the stability and the inherent rigidity of the airbag 18.

As is further evident from FIG. 1, the connecting portion 32 and the second bearing portion 36 extend approximately along the seat longitudinal direction L and constitute the transverse leg of the U, while the cushioning portion 30 and the first bearing portion 34 extend approximately in a seat transverse direction Q extending perpendicularly to the seat longitudinal direction L and in this case form the longitudinal legs of the U. In the shown embodiment, the longitudinal leg of the U formed by the first bearing portion 34 has a smaller expansion in the seat transverse direction Q than the cushioning portion 30 and hence is shorter. As a matter of course, the first bearing portion 34 can also have approximately the same (see, e.g., FIG. 5) or a larger (not shown) expansion in the seat transverse direction Q than the cushioning portion 30.

The lengths of the cushioning portion 30 and of the first bearing portion 34 as well as of the connecting portion 32 and of the second bearing portion 36 in the seat transverse and seat longitudinal directions Q, L may be freely selected at the skilled person's discretion.

The connecting portion 32 and the second bearing portion 36 are tightly connected to the airbag module 16 in the backrest 14, whereas the cushioning portion 30 is located freely in the vehicle interior in front of a seat back surface 24 of the backrest 14 and the first bearing portion 34 is adjacent to the rear of the backrest 14 freely and form-fittingly behind the backrest 14.

Figure 2:
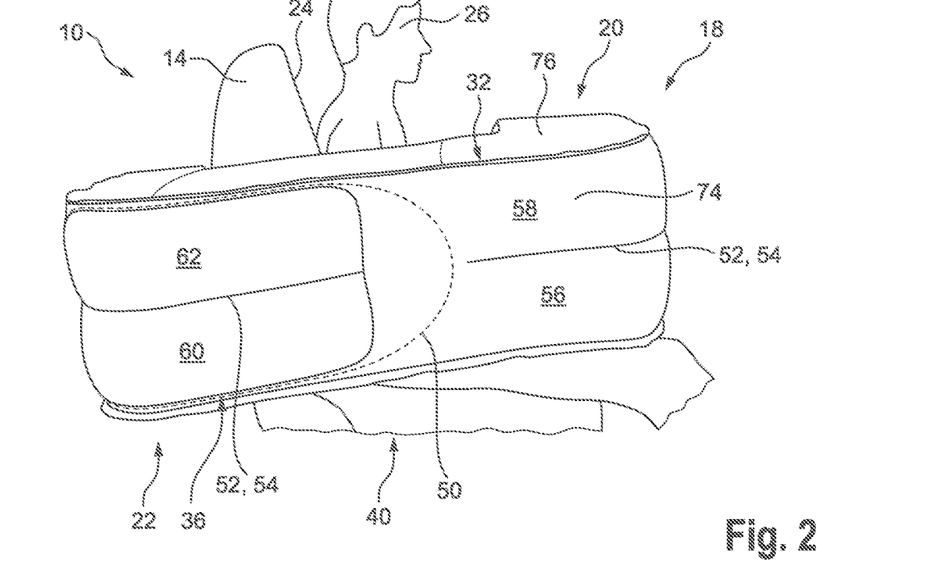
FIG. 2 a segment of the vehicle seat and a first embodiment of the airbag in a lateral view.

The seat back surface 24 is the surface against which a vehicle occupant 26 leans when he/she has taken a seat in the vehicle seat 12 (see FIG. 2, for example).

On the side facing the seat back surface 24, the cushioning portion 30 includes a baffle 42 that is intended to cushion the vehicle occupant 26 if he/she is displaced forward along the seat longitudinal direction L. The baffle 42 is opposed to and spaced apart from the seat back surface 24 so that the cushioning portion 30 of the completely filled airbag 18 is disposed approximately above the thighs of the vehicle occupant 26.

In the filled state of the airbag 18, the baffle 42 is approximately in parallel to a seat vertical direction H and/or in parallel to the seat back surface 24.

Along the seat vertical direction, the airbag may have an approximately constant height h, as shown in FIGS. 2 to 5, for example.

In an alternative embodiment, as shown in FIG. 6, the free end 80 of the cushioning portion 30 has a height $h_2$ along the seat vertical direction H. The cushioning portion 30 has approximately the same height $h_2$ also at a transition 31 to the connecting portion 32. In the extension of the connecting portion 32, the height thereof decreases to a height $h_1$ which the airbag 18 adopts directly at the backrest 14. The airbag 18 shown in FIG. 6 equally has the height $h_1$ in the extension of the second bearing portion 36 and of the first bearing portion 34. As a matter of course, the height h of the cushioning portion 30, the first bearing portion 34 and/or the second bearing portion 36 may also be provided (not shown) to decrease or increase in the respective extension. Such adaptation of the height h may be freely selected at the skilled person's discretion.

The jacket of the airbag 18 can be fabricated, for example, of plural individual cut parts which can be flatly spread each per se, wherein, for example, inner and outer surface parts 72, 74 are disposed in parallel to each other and are connected to the peripheral edges of two U-shaped lateral parts 76, 78. The free ends 80, 82 of the cushioning portion 30 and of the first bearing portion 34 can be formed by a separate edge part which may be formed, e.g., as a separate cut part or integrally with one or both of the lateral parts 76, 78.

The U-shaped lateral parts 76, 78 impart the U-shape three-dimensional in the filled state to the airbag 18.

As is illustrated in FIGS. 4 and 5, for example, the airbag 18 comprises two main chambers 46 and 48, a first main chamber 46 substantially forming the restraining portion 20 and a second main chamber substantially forming the supporting portion 22. Thus, the first and second main chambers 46, 48 and, consequently, also the restraining portion 20 and the supporting portion 22 are enabled to have different internal pressures in a filled state. In particular, the second main chamber 48 and, thus, the supporting portion 22, are provided to have a higher internal pressure so as to hereby increase the stability of the airbag 18.

In the area of the supporting portion 22, the airbag 18 can comprise an auxiliary airbag 50, wherein preferably the second main chamber 48 is formed by the auxiliary airbag 50. The auxiliary airbag 50 is formed by a separate airbag disposed inside the airbag 18. In the airbag 18 shown in FIG. 5, the auxiliary airbag 50 protrudes approximately up to the transition area 21 of the restraining portion 20 into the connecting portion 32 of the restraining portion.

The jacket of the auxiliary airbag 50 has a structure similar to the jacket of the airbag 18, the auxiliary airbag including, instead of the U-shaped lateral parts 76, 78, L-shaped lateral parts which in the filled state impart the three-dimensional shape to the auxiliary airbag 50.

When the airbag 18 is filled by the inflator 38, at first the second main chamber 48 formed by the auxiliary airbag 50 can be filled, before the first main chamber 46 is filled via overflow openings and/or overflow valves which may be disposed in a main chamber partition 70, for example. As an alternative, the two main chambers 46 and 48 can also be filled at the same time, for example, such as via a suitable diffusor of the inflator 38, or a separate inflator 38 can be associated with each of the main chambers 46 and 48.

In order to stabilize the L-shape of the restraining portion 20 and/or the supporting portion 22, specifically the angle between the cushioning portion 30, more precisely the baffle 42, and the connecting portion 32, and/or the angle between the first bearing portion 34 and the second bearing portion 36 in a situation of restraint, if the vehicle occupant 26 impacts the baffle 42, and to reduce a movement of the cushioning portion 30 along the seat longitudinal direction L, the airbag may comprise one or more stabilizing elements 52.

In FIGS. 2 to 6, the stabilizing element 52 is illustrated in the form of one or more flat L-shaped (FIGS. 2 to 5) or U-shaped (FIG. 6) tethers 54.

Figure 3:
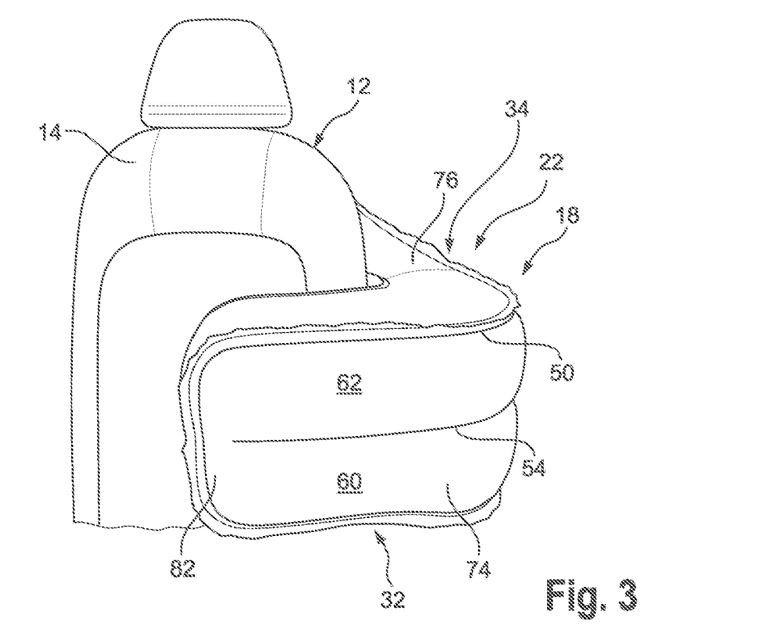
FIG. 3 the vehicle seat and the airbag of FIG. 2 in a rear view.

FIGS. 2 to 4 show a variant in which the tethers 54 divide each of the two main chambers 46 and 48 in the seat vertical direction H into two superimposed sub-chambers 56 and 58 as well as 60 and 62.

It is also possible, however, that only the second main chamber 48 is divided by a flat tether 54 into two sub-chambers 60 and 62, as exemplified in FIG. 5. In this embodiment, already sufficient stability and inherent rigidity of the airbag 18 can be obtained, inter alia, by the auxiliary airbag 50 protruding into the restraining portion 20 and being filled with a higher internal pressure. In addition, in this embodiment, the stability and inherent rigidity of the airbag 18 is increased by the fact that the angle α between the first bearing portion 34 and the second bearing portion 36 is smaller than 90°, and that the second bearing portion 36 and the connecting portion 32 which form the transverse leg 40 of the U are aligned with each other at an angle smaller than 180°.

Furthermore, it is also possible, as shown in FIG. 6, to provide a plurality of superimposed flat tethers 56.

The flat tether 56 is, e.g., a fabric part whose shape corresponds to the upper or lower lateral part 76, 78 of the jacket and, thus, to the U-shaped cross-section of the airbag 18, or a fabric part whose shape corresponds to the L-shaped cross-section of the auxiliary airbag 50, the restraining portion 20 or the supporting portion 22. Preferably, the flat tether 56 is disposed approximately in parallel to the lateral parts 76, 78 in the interior of the airbag 18 or of the auxiliary airbag 50 and is attached to the jacket of the airbag 18 or the auxiliary airbag 50 along its circumference. It is possible to connect the flat tether 56 to the jacket of the airbag 18 along its whole circumference or at specific sections only. For example, the tether 54 located in the restraining portion 20 of the airbag 18 in FIG. 4 is connected on the edge side to the inner surface part 72, the outer surface part 74 and additionally, via a connecting seam 84, to the auxiliary airbag 50.

At the airbag 18 in FIG. 1 two further possible stabilizing elements 52 are shown. It is possible to provide the stabilizing elements 52 individually or in any combination on the airbag 18.

In one variant, the stabilizing element 52 can be formed by a tether 64 extending inside a fillable area 21 of the restraining portion 30 of the airbag 18 (in FIG. 1 shown by a dash two-dot line) which is connected to the backrest 14, in this example to a retraction mechanism 66, as well as an exterior of the jacket facing the baffle 42 on the cushioning portion 30. The fillable area 21 is the volume of the restraining portion 20 which is filled with filling gas by the inflator and which is constituted by the main chamber 46 in this case. The retraction mechanism 66 by which the tether 64 in this example is connected to the back rest 14 is designed to reduce a free length of the tether 64 during the situation of restraint. The retraction mechanism 66 is, e.g., a belt retractor or a belt tensioner (not shown in detail). The retraction mechanism 66 is activated, while or after the airbag 18 is filled or the vehicle occupant 26 impacts the baffle 42, to produce tensile force toward the seat back surface 24 which counteracts the load F applied by the vehicle occupant 26 to the cushioning portion 30 (see FIG. 2) and additionally stabilizes the cushioning portion 30 relative to the connecting portion 32.

In another variant, the stabilizing element 52 is formed by a flat fabric sail 68 (shown in FIG. 1 by a dash-dot line) which is attached to the outside of the airbag 18 outside the fillable area 21 at the transition 31 between the connecting portion 32 and the cushioning portion 30 in parallel to the upper lateral part 78 or in parallel to the lower lateral part 76 of the jacket of the airbag 18. In this case, the fabric sail 68 takes the shape of a right-angled triangle, the two legs of the triangle being fixed to the outer surface part 74, specifically to a connecting seam between the outer surface part 74 and the respective lateral part 76, 78. The hypotenuse of the triangle thus extends from the connecting portion 32 to the cushioning portion 30. The cushioning portion 30 can also be additionally stabilized relative to the connecting portion 32 by the fabric sail 68, if the vehicle occupant 26 impacts the baffle 42. Such fabric sail 68 can also be attached, as a matter of course, to the outside of the airbag 18 outside the fillable area 23 at the transition 33 between the second bearing portion 36 and the first bearing portion 34 in parallel to the upper lateral part 78 or in parallel to the lower lateral part 76 of the jacket of the airbag 18.

The above-described stabilizing elements 52 can be used at the skilled person's discretion together, alone or in any combination to further increase the stability and/or inherent rigidity of the airbag 18.

The invention claimed is:

1. A vehicle occupant restraint system comprising a vehicle seat which includes a backrest with a seat back surface, the seat back surface being provided for a vehicle occupant seated in the vehicle seat to lean against the same, and comprising an airbag module integrated in the vehicle seat which includes an airbag being U-shaped in a horizontal section plane,
wherein the airbag comprises an L-shaped restraining portion and an L-shaped supporting portion,
wherein the L-shaped restraining portion includes a fillable cushioning portion forming a first leg of the L-shape which is positioned along a seat longitudinal direction spaced apart from the seat back surface and which has a baffle directed toward the seat back surface, the baffle being provided to cushion the vehicle occupant, if he/she is displaced forward along the seat longitudinal direction, and includes a fillable connecting portion forming a second leg of the L-shape which connects the cushioning portion to the vehicle seat,
wherein the L-shaped supporting portion includes a fillable first bearing portion forming a first leg of the L-shape which is positioned along a seat longitudinal direction behind the backrest, and a fillable second bearing portion forming a second leg of the L-shape which connects the first bearing portion to the vehicle seat,
wherein the connecting portion of the restraining portion and the second bearing portion of the supporting portion form a transverse leg of the U-shape,
wherein the supporting portion includes a bearing surface directed toward the backrest, wherein the airbag is configured so that the supporting portion in a filled state has a higher internal pressure than the restraining portion so that the bearing surface is configured to engage the seatback in response to, and to counteract, a load being directed away from the seat back surface in the seat longitudinal direction and acting on the restraining portion, if the vehicle occupant impacts the baffle, so as to stabilize the restraining portion relative to the vehicle seat.

2. The vehicle occupant restraint system according to claim 1, wherein the airbag comprises two separate main chambers, specifically wherein a first main chamber forms substantially the restraining portion and a second main chamber forms substantially the supporting portion.

3. The vehicle occupant restraint system according to claim 2, wherein the second main chamber forming the supporting portion is configured by an auxiliary airbag, the auxiliary airbag being arranged specifically in the interior of the airbag.

4. The vehicle occupant restraint system according to claim 1, wherein the airbag, specifically the restraining portion and/or the supporting portion, comprises a stabilizing element.

5. The vehicle occupant restraint system according to claim 4, wherein the stabilizing element is formed by one or more tethers extending in an interior of a fillable area of the restraining portion and/or of the supporting portion.

6. The vehicle occupant restraint system according to claim 5, wherein the one or more tethers divide the restraining portion and/or the supporting portion into plural fillable sub-chambers superimposed perpendicularly to the seat longitudinal direction.

7. The vehicle occupant restraint system according to claim 4, wherein at least one tether is provided which, when being flatly spread, is L-shaped corresponding to the L-shaped cross-section of the restraining portion and the supporting portion, or is U-shaped corresponding to the U-shaped cross-section of the airbag.

8. The vehicle occupant restraint system according to claim 4, wherein at least one tether is provided which is coupled, on the seat side, to a retraction mechanism reducing the length of the tether in the fillable area of the restraining portion during the situation of restraint.

9. The vehicle occupant restraint system according to claim 4, wherein the stabilizing element is disposed on the outside of the airbag, specifically as a fabric sail fixed to the cushioning portion and to the connecting portion in a transition which is formed by the cushioning portion and the connecting portion.

10. A vehicle occupant restraint system comprising:
a vehicle seat including a backrest with a front surface that faces forward along a seat longitudinal direction and is configured to be leaned against by a seated vehicle occupant, and a rear surface opposite the front surface facing rearward along the seat longitudinal direction; and
an airbag module mounted in the backrest, the airbag module comprising an airbag and an inflator, the airbag comprising an inflation mouth portion connected to the inflator and configured to receive and deliver inflation fluid from the inflator into the airbag;
wherein the airbag is configured to exit the backrest laterally and to deploy forward and rearward of the backrest;
wherein the airbag comprises a restraining portion having an L-shaped configuration and a supporting portion having an L-shaped configuration, the restraining portion being configured to deploy forward from the inflation mouth, and the supporting portion being configured to deploy rearward from the inflation mouth,
wherein the restraining portion includes a cushioning portion and a connecting portion, the connecting portion forming a first leg of the L-shape of the restraining portion and being configured to extend forward from the inflation mouth along the seat longitudinal direction to a transition where the connecting portion meets the cushioning portion, the cushioning portion being configured to extend laterally across the vehicle seat forward of the backrest and forward of the seated vehicle occupant, the cushioning portion comprising a baffle configured to receive and cushion the vehicle occupant when displaced forward along the seat longitudinal direction,
wherein the supporting portion comprises first and second bearing portions, the second bearing portion forming a first leg of the L-shape of the restraining portion and being configured to extend rearward from the inflation mouth along the seat longitudinal direction to a transition where the second bearing portion meets the first bearing portion, the first bearing portion being configured to extend laterally along the rear surface of the backrest and comprising a bearing surface configured to engage the rear surface of the backrest,
wherein the airbag is configured so that the supporting portion in a filled state has a higher internal pressure than the restraining portion so that the bearing surface is configured to engage the rear surface of the seatback to counteract a load being directed away from the front surface of the seat back in the seat longitudinal direction and acting on the baffle so as to stabilize the restraining portion relative to the vehicle seat.

11. The vehicle occupant restraint system according to claim 10, wherein the airbag comprises two separate main chambers, specifically wherein a first main chamber forms substantially the restraining portion and a second main chamber forms substantially the supporting portion.

12. The vehicle occupant restraint system according to claim 11, wherein the second main chamber forming the supporting portion is configured by an auxiliary airbag, the auxiliary airbag being arranged specifically in the interior of the airbag.

13. The vehicle occupant restraint system according to claim 10, wherein the airbag, specifically the restraining portion and/or the supporting portion, comprises a stabilizing element.

14. The vehicle occupant restraint system according to claim 13, wherein the stabilizing element is formed by one or more tethers extending in an interior of a fillable area of the restraining portion and/or of the supporting portion.

15. The vehicle occupant restraint system according to claim 14, wherein the one or more tethers divide the restraining portion and/or the supporting portion into plural fillable sub-chambers superimposed perpendicularly to the seat longitudinal direction.

16. The vehicle occupant restraint system according to claim 13, wherein at least one tether is provided which, when being flatly spread, is L-shaped corresponding to the L-shape of the restraining portion and the supporting portion, or is U-shaped corresponding to the U-shaped cross-section of the airbag.

17. The vehicle occupant restraint system according to claim 13, wherein at least one tether is provided which is coupled, on the seat side, to a retraction mechanism reducing the length of the tether in the fillable area of the restraining portion during the situation of restraint.

18. The vehicle occupant restraint system according to claim 13, wherein the stabilizing element is disposed on the outside of the airbag, specifically as a fabric sail fixed to the cushioning portion and to the connecting portion in a transition which is formed by the cushioning portion and the connecting portion.

19. The vehicle occupant restraint system according to claim 10, wherein the airbag has a generally U-shaped configuration with the cushioning portion forming a first leg of the U-shape, the first bearing portion forming a second leg of the U-shape, and the combination of the supporting portion and the second bearing portion forming a third leg of the U-shape that connects the first and second legs, wherein the airbag is configured so that a load exerted by the occupant on the first leg of the U-shape causes the second leg of the U-shape to be pulled into engagement with the rear surface of the seatback.

20. The vehicle occupant restraint system according to claim 10, wherein the airbag is configured so that the load directed away from the front surface of the seat back in the seat longitudinal direction pulls the bearing surface of the first bearing portion against the rear surface of the seatback.

* * * * *